United States Patent [19]

Syred et al.

[11] Patent Number: 4,585,466

[45] Date of Patent: Apr. 29, 1986

[54] CYCLONE SEPARATORS

[75] Inventors: Nicholas Syred, Cardiff; Martin Biffin, Pontyclun, both of Wales; Ieuan Owen, Hoylake, England

[73] Assignee: Coal Industry (Patents) Limited, London, England

[21] Appl. No.: 506,549

[22] PCT Filed: Oct. 27, 1982

[86] PCT No.: PCT/GB82/00305

§ 371 Date: Jun. 10, 1983

§ 102(e) Date: Jun. 10, 1983

[87] PCT Pub. No.: WO83/01584

PCT Pub. Date: May 11, 1983

[30] Foreign Application Priority Data

Oct. 27, 1981 [GB] United Kingdom ................. 8132302

[51] Int. Cl.[4] ............................................. B01D 45/12

[52] U.S. Cl. ....................................... 55/349; 55/398; 55/459 R; 55/461; 210/512.2

[58] Field of Search .................. 55/345, 349, 392, 398, 55/452, 459 R, 459 A, 460, 461; 210/512.2, 346, 348

[56] References Cited

U.S. PATENT DOCUMENTS

| | | | |
|---|---|---|---|
| 763,199 | 6/1904 | Newton et al. | 55/398 |
| 1,513,528 | 10/1924 | Bamber | 55/398 |
| 2,290,664 | 7/1942 | Allardice | 55/459 R |
| 3,283,480 | 11/1966 | Szego | 55/459 R |
| 3,972,698 | 8/1976 | Klein et al. | 55/460 X |
| 3,990,976 | 11/1976 | Nishioka | 210/512.1 |
| 4,097,381 | 6/1978 | Ritzler | 55/459 R |
| 4,268,277 | 5/1981 | Rooker et al. | 55/398 X |

FOREIGN PATENT DOCUMENTS

| | | | |
|---|---|---|---|
| 0787197 | 6/1968 | Canada | 210/512.2 |
| 0613363 | 11/1948 | United Kingdom . | |

*Primary Examiner*—Charles Hart
*Attorney, Agent, or Firm*—Stevens, Davis, Miller & Mosher

[57] ABSTRACT

An improved cyclone separator comprises a body defining a main vortex chamber having an inlet and a fluid outlet. A secondary vortex chamber communicates with and opens into the main vortex chamber.

12 Claims, 17 Drawing Figures

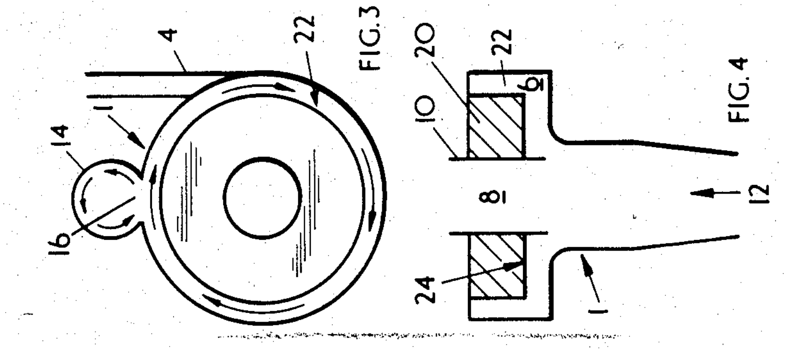
FIG.3
FIG.4
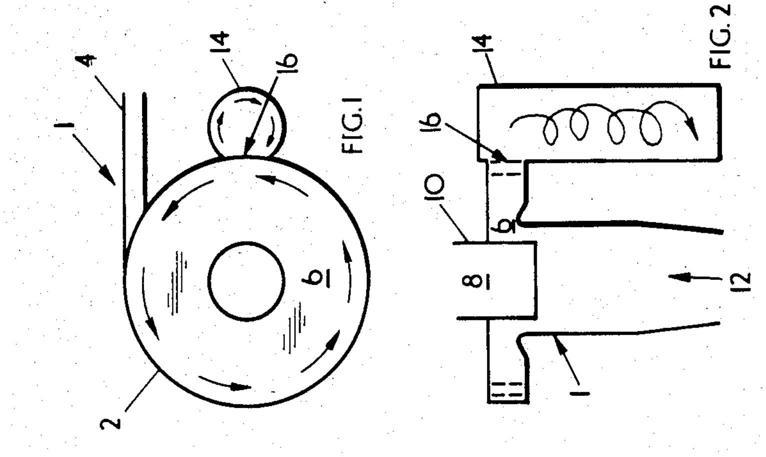
FIG.1
FIG.2

CYCLONE SEPARATORS

This invention concerns improvements in or relating to cyclone separators employed for the separation of particles from fluids, i.e. gases or liquids, or of fluids of differing densities or compositions.

The present invention has particular, although not exclusive reference to such separators for gas cleaning and more especially, although not limited to such an application, for the cleaning of hot gases to remove particulates therefrom. One of the problems associated with conventional cyclone separators is that with a fluid having a heavy contaminant loading, for example a dust loading, clogging occurs thus rendering the equipment ineffective or inefficient. One way of attempting to overcome this problem is to employ a number of separators, but this gives rise to added capital expenditure and increased maintenance costs, while not necessarily effecting a substantial improvement in operational efficiency. Furthermore, with space being at a premium on some plants requiring effective separation, the provision of more than one or two separators is unattractive.

An object of the present invention is thus to provide an improved cyclone separator which at least in part affords a solution to the problems attendant upon conventional devices and which offers higher efficiencies coupled with the benefit of compactness.

Accordingly, this invention provides a cyclone separator including a body defining a main vortex chamber therewithin, an inlet in the body for a contaminated fluid, an outlet for the fluid, an outlet for the contaminant, and means associated with the body to define a secondary vortex chamber in communication with the main vortex chamber.

The inlet for the contaminated fluid is preferably arranged tangentially such as to induce vortical flow within the main vortex chamber, and may communicate internally of the body with a primary annular section in which in use tangential flow is allowed to develop smoothly prior to entry into the main vortex chamber. A weir may be provided intermediate the annular section and the main vortex chamber with the object of providing a symmetrical flow and vortex with low overall turbulence levels.

The secondary vortex chamber is located at the outer periphery of and opens into the main vortex chamber and is preferably of cylindrical form.

More than one secondary vortex chamber may be provided at different locations along the path of the contaminated fluid between the inlet therefor and the fluid outlet. The different locations are conveniently defined by intermediate sections which may be in the form of circular grooves provided internally of the body in the main vortex chamber. The secondary vortex chambers are placed at locations along the various paths to provide in use the maximum shear of at least some of the particles from the main vortex, a secondary vortex system being generated in each secondary vortex chamber whereby the particles are centrifuged and can be removed from each chamber.

The body of the separator may have a central cone for the collection of the contaminant leading from the main vortex chamber, a secondary vortex chamber, communicating with the entry to the cone. As an alternative, the body may have a central cylindrical subsidiary vortex chamber leading from the main vortex chamber, the subsidiary vortex chamber having a secondary vortex chamber communicating therewith.

A conical diffuser together with a centre body may be located at the fluid outlet from the body with the object of reducing the pressure drop across the separator.

By way of example, six embodiments of cyclone separator according to the invention are described below with reference to the accompanying drawings in which:

FIG. 1 is a diagrammatic plan view of a first embodiment;

FIG. 2 is a side view corresponding to FIG. 1;

FIG. 3 is a diagrammatic plan view of a second embodiment;

FIG. 4 is a sectional side view corresponding to FIG. 3;

Like parts are given like references throughout the description.

Figure 5:
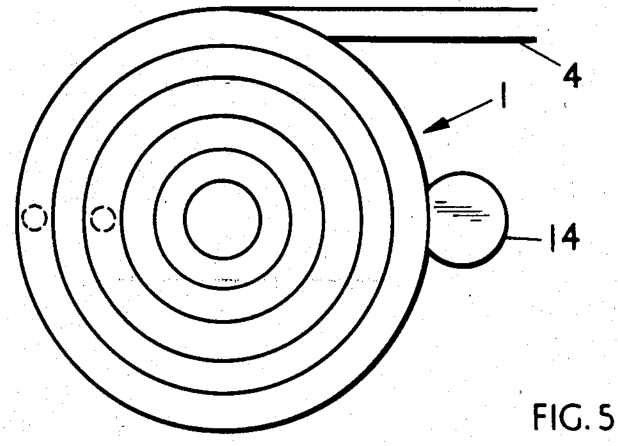
FIG. 5 is a diagrammatic plan view of a third embodiment.

Referring to FIGS. 1 and 2, a cyclone separator is shown diagrammatically at 1 and comprises a generally cylindrical body 2 having a tangential contaminant fluid inlet, for example a gas and particle inlet 4 leading into a main vortex chamber 6 defined within the body 2. A fluid, for example a gas, outlet 8 defined by a cylindrical section 10 penetrating the chamber 6 is provided centrally in the top of the body 2 which has a particle outlet 12 in the base thereof.

Located at the periphery and in flow communication with the main vortex chamber 6 is a cylindrical secondary vortex chamber 14, the two chambers having complementary apertures 16 and the chamber 14 having a particle discharge outlet (not shown).

In operation a dust-laden gas is fed to the inlet 4 and flows around the main vortex chamber 6 in which vortical flow is generated, the centrifugal force sending particles of dust in a layer to the periphery of the chamber 6. A significant proportion of that layer is sheared off into the secondary vortex chamber 14 which is suitably positioned on the periphery of chamber 6 to give this effect. Dust particles are carried into the chamber 14 wherein a second vortex is generated and the swirl effects centrifuging of the dust particles which precipitate to the base of the chamber 14 whence they are periodically removed. The cleaned gas discharges through the single outlet 8.

Referring now to FIGS. 3 and 4, the second embodiment of cyclone separator 1 comprises internally of the body 2 a member 20 which defines an annular section 22 with which the inlet 4 communicates and a weir 24 intermediate the section 22 and the main vortex chamber 6, the section 10 incorporating the central gas discharge outlet 8 passing through the member 20. A secondary vortex chamber 14 communicates with the section 22 of the main vortex chamber 6.

In use, gas and particles enter the separator 1 through the inlet 4 and thence pass into the annular section 22 which also has a secondary vortex chamber 14 into which at least some of the dust particles flow and are therein precipitated. The gas and remaining dust particles flow into the first channel 38 around the baffle ring 36 and some particles are removed from the stream into the associated secondary vortex chamber 14. The gas and dust particles progress toward the centre of the separator 1 and thus flow into the relatively inner channel 38 following the path defined by the relevant ring 36, further particles being sheared off into the secondary vortex chamber 14 associated with that channel 38. Finally the gas and remaining dust particles pass out of the main channel 38 to emerge therefrom to undergo further vortex action and particle precipitation, the dust-free gas leaving through the outlet 8 and the particles accumulating at the base of the separator.

It will be appreciated that in this embodiment several stages of separation occur and at each one particles are removed into the secondary vortex chamber from the main vortex chamber 6 and thus a number of discharge points is established. It is envisaged that the size of particles centrifuged will vary from the periphery of the separator to the centre thereof and that the various sizes can be removed separately through the agency of the secondary vortex chambers.

Figure 9:
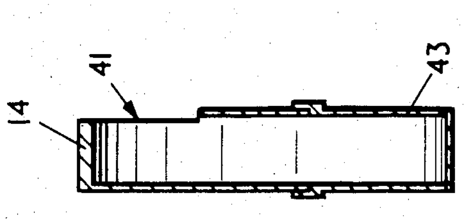
FIG. 9 is a side sectional view of a detail shown in FIG. 8.
Figure 7:
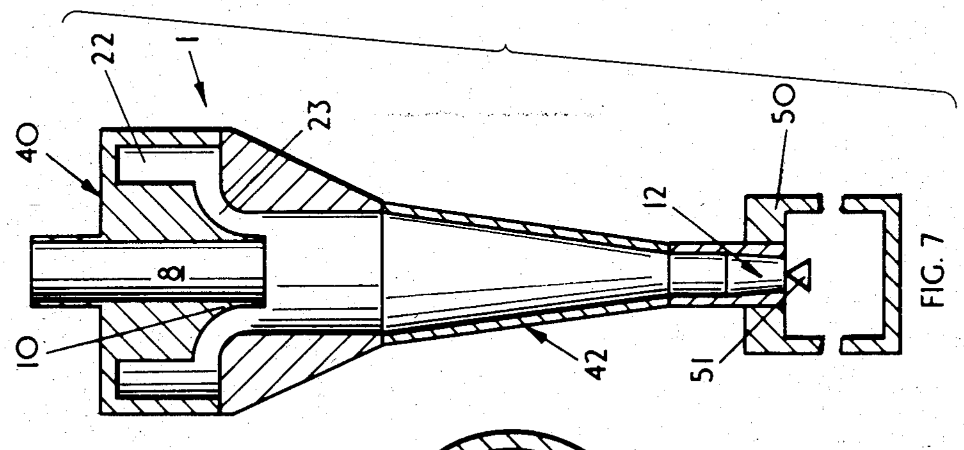
FIG. 7 is a sectional side elevation of a fourth embodiment.
Figure 8:
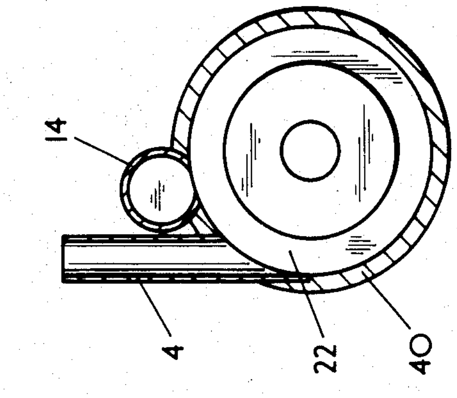
FIG. 8 is a sectional view n the line VIII—VIII in FIG. 7.

Referring to FIGS. 7, 8 and 9, the cyclone separator 1 shown has a top part 40 and a lower collector part or dust cone 42. The top part 40 incorporates a tangential inlet 4 leading to an annular section 22 which communicates with a lower annular section 23 defined by the outlet tube section 10. A secondary vortex chamber 14 opens into the annular section 22 and is shown in detail in FIG. 9; it has an opening 41 corresponding with the depth of section 22 and has a detachable particle collection box 43.

A particle collection box 50 is provided beneath the lower part 42 and a valve 51 is provided for the particle outlet 12.

The fourth embodiment functions in essentially the same way as the previous embodiments in that initial swirl is given in section 22 to the incoming dust-laden gas and some of the dust particles flow out into chamber 14 wherein they undergo centrifugal precipitation under the action of the secondary vortex. The residual dust together with the entraining gas passes into the lower annular section 23 wherein further centrifugal action in the vortex precipitates further dust particles, the gas discharing through the outlet 8. The sections 22 and 23 constitute the main vortex chamber, and the dust particles separated therein are removed periodically from box 50 as are the particles from box 43 in chamber 14.

Figure 10:
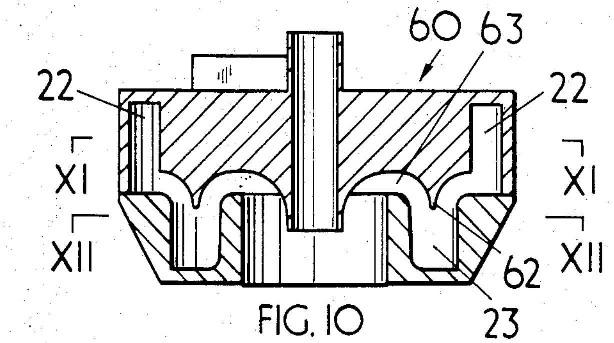
FIG. 10 is a side sectional view of a part of a fifth embodiment.
Figure 11:
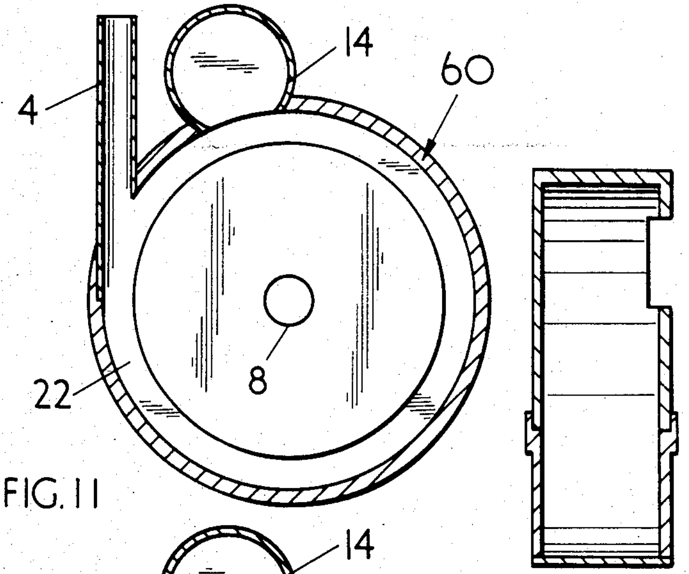
FIG. 11 is a sectional plan view on the line XI—XI in FIG. 10.
Figure 12:
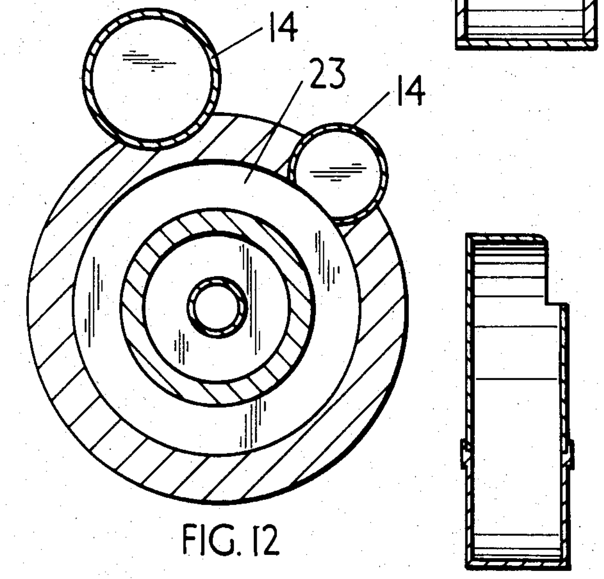
FIG. 12 is a sectional plan view on the line XII—XII in FIG. 10.
Figure 13:
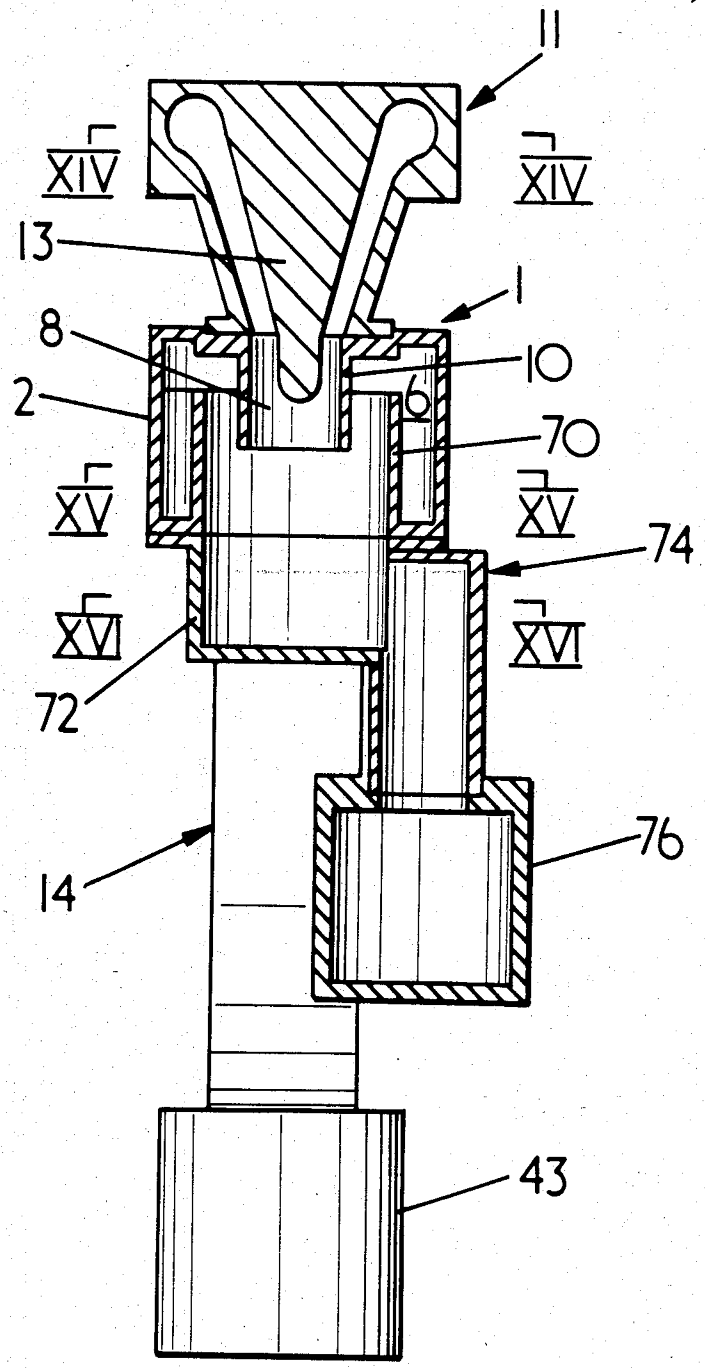
FIG. 13 is a sectional side elevation of a sixth embodiment.
Figure 14:
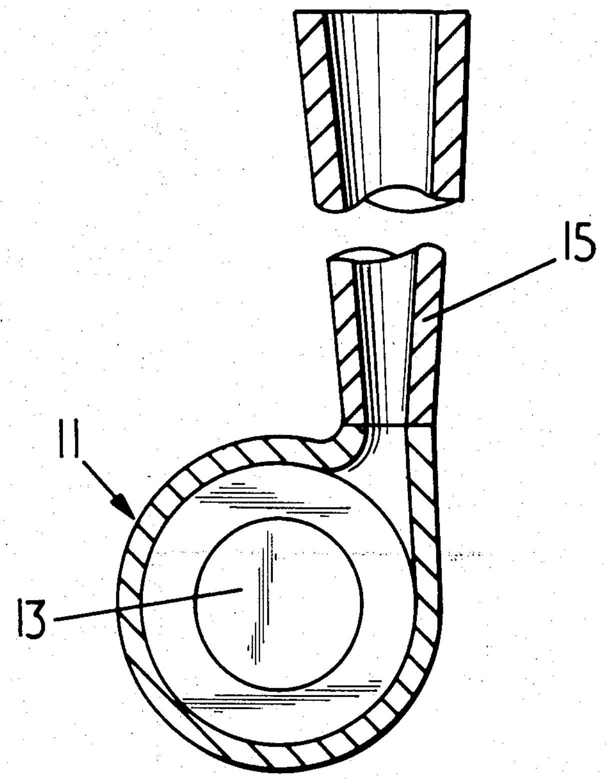
FIG. 14 is a sectional plan view on the line XIV—XIV of FIG. 13.
Figure 15:
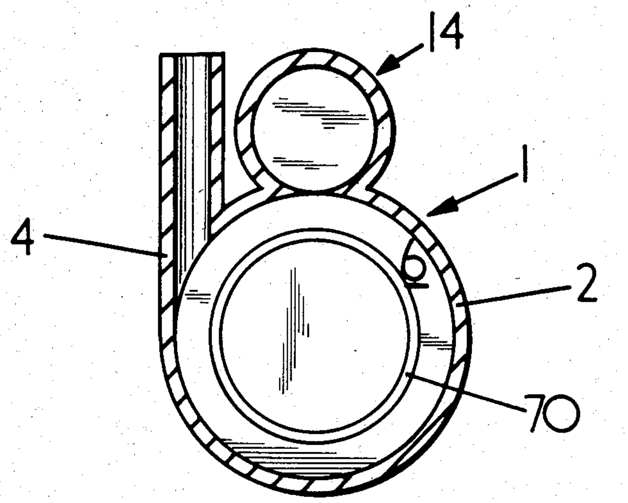
FIG. 15 is a sectional view on the line XV—XV of FIG. 13.
Figure 16:
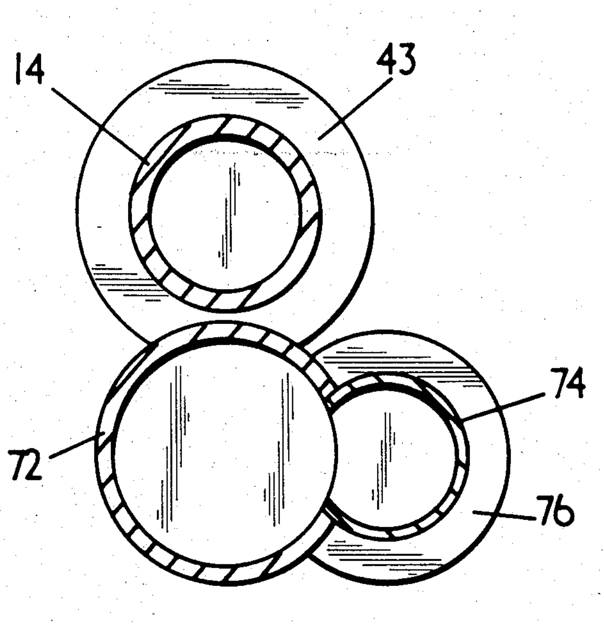
FIG. 16 is a sectional view on the line XVI—XVI of FIG. 13.

Referring to the fifth embodiment shown in FIGS. 10, 11 and 12, a top part 60 of a cyclone separator is so formed as to provide a tortuous path for a dust-laden gas. The part 60 has the usual tangential inlet 4 into annular section 22 which has a secondary vortex chamber 14 as seen in FIG. 11. A lower annular section or channel 23 into which depends a baffle ring 62 is provided beneath section 22 and is of a smaller diameter than section 22. A profiled passage 63 connects section 23 to the central portion of the main vortex chamber, the section 23 having a secondary vortex chamber 14 communicating therewith.

Figure 6:
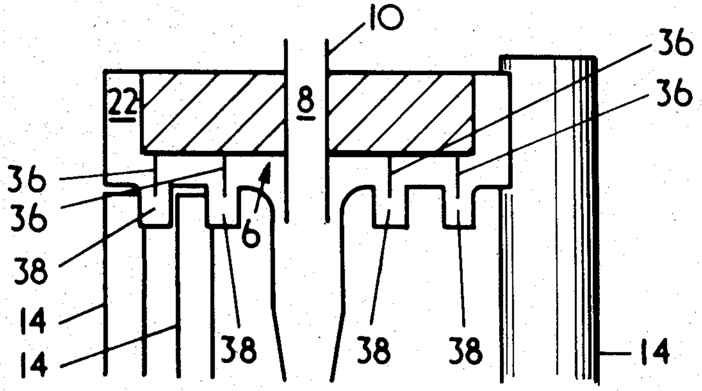
FIG. 6 is a sectional side view corresponding to FIG. 5.

The separator of the fifth embodiment functions in a similar way to that shown in FIGS. 5 and 6 save that only one channel 23 is provided.

With reference to FIGS. 13 to 17, a sixth embodiment of cyclone separator 1 is shown and comprises a generally cylindrical body 2 having a tangential contaminant fluid inlet, for example a gas and particulate inlet 4, leading into a main vortex chamber 6 defined within the body. A fluid outlet, for example a gas outlet 8, defined by a cylindrical section 10 penetrating the chamber 6, is provided centrally in the top of the body 2 and a diffuser 11 having a conical core 13 is situated therewithin. A tangential exhaust duct 15 extends from the diffuser 11.

Figure 17:
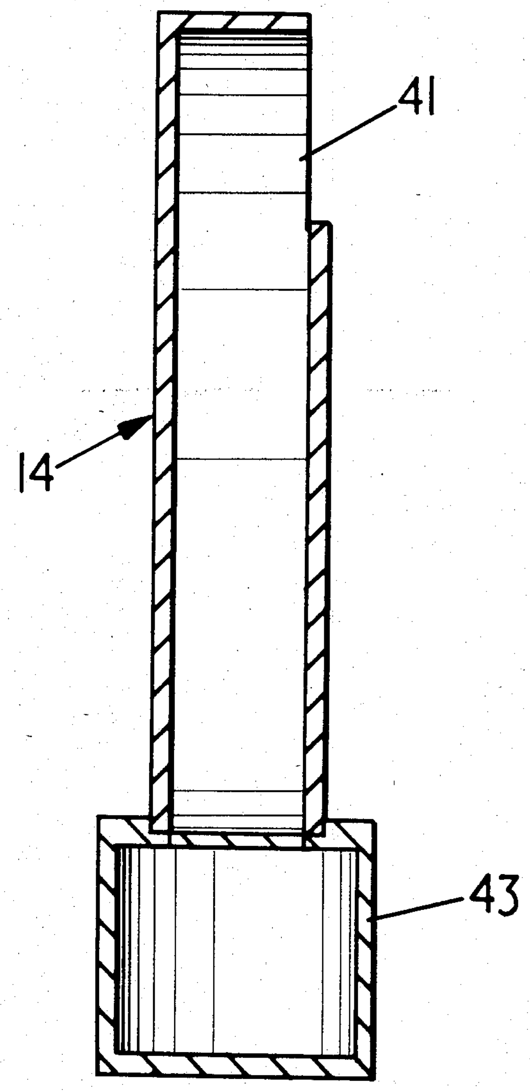
FIG. 17 is a side sectional view of a detail of FIG. 13.

Located at the periphery of and in flow communication with the main vortex chamber 6 is a cylindrical first stage secondary vortex chamber 14 which is shown in more detail in FIG. 17. The chamber 14 has an opening 41 corresponding with the depth of the body 2 and has a particle collection box 43, the opening 41 corresponding with an aperture or slot in the body 2.

A weir 70 of short cylindrical form is disposed coaxially within the body 2 and leads to a lower vortex chamber 72 which is provided with a second stage secondary vortex chamber 74 opening thereinto and having a collection box 76.

In use, a particle-laden gas, which may be at an elevated temperature, is passed through the tangential inlet 4 and flows around the main vortex chamber 6 in which vortical flow is generated, the centrifugal force sending particles in a layer to the periphery of the chamber 6. A significant proportion of that layer is sheared off into the secondary vortex chamber 14 which is suitably positioned on the periphery of chamber 6 to give this effect, the inertia of the particles carrying them into the secondary vortex chamber where they undergo rapid deceleration and are entrained by the secondary vortex generated. The particles rapidly spiral to the bottom of this chamber 14 and thus collect in the box 43 whence they may be removed periodically. There is no net flow of gas into or out of the secondary vortex chamber and thus no secondary flows or gas currents to convey particles out of the chamber 14 because, as shown in the drawings, the chamber 14 is closed at both its top and bottom.

The gas together with some particles still entrained spills over the weir 70 which generates symmetrical flow whence the gas and particles pass into the lower vortex chamber 74. The particles are sheared off from the gas flow into the second stage secondary vortex chamber 74 in a similar manner to that described above wherein they are deposited in the collection box 76. The particle free gas issues from the cyclone via the outlet 8 and in so doing passes through the diffuser 11 and thence to the tangential exhaust duct 15. The effect of this diffuser is to reduce the pressure drop across the cyclone separator.

The advantage of the sixth embodiment is that the usual cone attached to the main vortex chamber is dispensed with and the overall height dimensions reduced as a result.

It is to be understood that whilst the specific embodiments disclosed herein have been described in relation to their use as dust separators, the invention is not confined to such application. For example, the cyclone separator may be employed for separating particles from liquids or may be used for separating fluids of differing densities, where mixtures of gasses or liquids need to be separated.

The advantages of the present invention are that in certain embodiments by providing channels additional dust collection centres are formed and the main vortex is strengthened by reducing boundary layer effects. The provision of the secondary vortex chambers allows gases with very high dust loadings to be cleaned in a single stage as the outer secondary vortex chambers collect most of the larger particles and enable more efficient separation at the centre where blockage usually occurs with conventional cyclone separators. Particles of different size can therefore be graded in different secondary vortex chambers.

We claim:

1. A cyclone separator including a body defining a main vortex chamber therewithin having a main vortex therein during operation, an inlet in the body for a contaminated fluid, an outlet for the fluid, an outlet for the contaminant, wherein the invention comprises a secondary vortex chamber in communication with an opening into the main vortex chamber at the periphery thereof, the secondary vortex chamber being closed at the top and bottom thereof and having an outlet openable periodically for removal of contaiminants whereby in use no net fluid flow into or out of the secondary vortex chamber occurs, both the main and secondary vortex chambers being circular in horizontal cross section with the main chamber being of larger diameter, the main and secondary chambers lying in the relationship of overlapping circles with the opening between the chambers occupying the area of overlap and being unobstructed said main vortex, said chamber overlapping and said opening comprising a means for generating a vortex in the secondary chamber, the opening thus having a "V" shape along its vertical edge when viewed in said horizontal cross section with the edge of the "V" comprising a means for shearing off the dust particles from the vortex of the main chamber and directing them into the secondary chamber.

2. A cyclone separator according to claim 1 in which the secondary vortex chamber is of cylindrical form.

3. A cyclone separator according to claim 1 in which a plurality of secondary vortex chambers is provided at different locations along the path of the contaminated fluid between the inlet therefor and the fluid outlet.

4. A cyclone separator according to claim 3 in which the different locations are defined by intermediate sections in the form of circular grooves provided internally of the body in the main vortex chamber.

5. A cyclone separator according to claim 4 in which baffles project into the grooves to provide a tortuous path.

6. A cyclone separator according to claim 1 in which the inlet for the contaminated fluid is arranged tangentially and communicates internally of the body with a primary annular section of the main vortex chamber.

7. A cyclone separator according to claim 6 in which a weir is provided intermediate the primary annular section and a central section of the main vortex chamber.

8. A cyclone separator according to claim 1 in which the main vortex chamber has a primary annular section and a central section having a weir is located intermediate the annular section and the central section, a first stage secondary vortex chamber communicates with and opens into the main vortex chamber, and a second stage secondary vortex chamber communicates with and opens into the subsidiary vortex chamber.

9. A cyclone separator according to claim 1 in which a diffuser is located in association with the outlet for the fluid.

10. A cyclone separator according to claim 1 in which a receptacle is provided for the or each secondary vortex chamber for receiving separated contaminant.

11. A cyclone separator according to claim 1 in which a central cone for the collection of the contaminant leads from the main vortex chamber.

12. The separator of claim 1 in which the vortex in the secondary chamber rotates in opposite sense from that of the main chamber.

* * * * *